(12) United States Patent
Mody et al.

(10) Patent No.: US 12,256,108 B2
(45) Date of Patent: *Mar. 18, 2025

(54) HIGH DEFINITION VP8 DECODER

(71) Applicant: TEXAS INSTRUMENTS INCORPORATED, Dallas, TX (US)

(72) Inventors: Mihir Narendra Mody, Karnataka (IN); Chaitanya S. Ghone, Karnataka (IN); Joseph Meehan, Valbonne (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/367,387

(22) Filed: Jul. 4, 2021

(65) Prior Publication Data

US 2021/0337242 A1   Oct. 28, 2021

Related U.S. Application Data

(63) Continuation of application No. 16/432,317, filed on Jun. 5, 2019, now Pat. No. 11,115,683, which is a continuation of application No. 15/646,258, filed on Jul. 11, 2017, now Pat. No. 10,321,163, which is a continuation of application No. 13/950,042, filed on Jul. 24, 2013, now Pat. No. 9,706,229.

(30) Foreign Application Priority Data

Jun. 5, 2013 (EP) ..................... 13290124

(51) Int. Cl.
*H04N 19/86* (2014.01)
*H04N 19/42* (2014.01)
*H04N 19/44* (2014.01)
*H04N 19/82* (2014.01)

(52) U.S. Cl.
CPC ............. *H04N 19/86* (2014.11); *H04N 19/42* (2014.11); *H04N 19/44* (2014.11); *H04N 19/82* (2014.11)

(58) Field of Classification Search
None
See application file for complete search history.

(56) References Cited

U.S. PATENT DOCUMENTS

2003/0206593 A1   11/2003   Srinivasan
2005/0053143 A1*   3/2005   Holcomb ............. H04N 19/102
                                                         375/240.18

(Continued)

*Primary Examiner* — Dakshesh D Parikh
(74) *Attorney, Agent, or Firm* — Carl G. Peterson; Frank D. Cimino

(57) ABSTRACT

A video decoder system, in one embodiment, includes one or more processors and a memory storing instructions that when executed by the one or more processors cause the video decoding system to perform an entropy decoding operation in a frame level pipelined manner on a bitstream representative of encoded video data to produce first output data, perform at least one of an inverse quantization operation or an inverse frequency transform operation in a row level pipelined manner on the first output data to produce second output data, perform a deblocking filtering operation on first input data that includes the second output data in a row level pipelined manner to produce third output data, and output a decoded video output based on the third output data.

16 Claims, 5 Drawing Sheets

(56) References Cited

U.S. PATENT DOCUMENTS

| | | | |
|---|---|---|---|
| 2008/0012872 A1* | 1/2008 | Flickinger | H04N 21/4347 345/581 |
| 2008/0170611 A1 | 7/2008 | Ramaswamy | |
| 2010/0254463 A1* | 10/2010 | Narroschke | H04N 19/172 375/E7.193 |
| 2011/0249746 A1* | 10/2011 | Yang | H04N 19/00 375/240.16 |
| 2012/0057632 A1* | 3/2012 | Sato | H04N 19/51 375/E7.125 |
| 2012/0179833 A1* | 7/2012 | Kenrick | H04N 21/4333 709/231 |
| 2012/0328022 A1* | 12/2012 | Sasai | H04N 19/70 375/240.16 |
| 2014/0286400 A1* | 9/2014 | Joshi | H04N 19/593 375/240.03 |
| 2014/0286413 A1 | 9/2014 | Joshi | |

* cited by examiner

HIGH DEFINITION VP8 DECODER

CROSS-REFERENCE TO RELATED APPLICATION(S)

This application is a continuation of U.S. patent application Ser. No. 16/432,317 filed on Jun. 5, 2019, which is a continuation of U.S. patent application Ser. No. 15/646,258 filed on Jul. 11, 2017 and now U.S. Pat. No. 10,321,163, which is a continuation of U.S. patent application Ser. No. 13/950,042 filed on Jul. 24, 2013 and now U.S. Pat. No. 9,706,229, which claims priority to European Patent Application No. 13290124.0/EP13290124 filed on Jun. 5, 2013, the entireties of all of which are incorporated by reference herein.

TECHNICAL FIELD OF THE INVENTION

The technical field of this invention relates to image compression.

BACKGROUND

H.264/AVC, also known as MPEG-4, is the predominant video compression standard in use today. However, H.264 is covered by a number of patents that require a royalty payment for users of the standard. VP8 was developed as an open source standard.

SUMMARY

The VP8 video decoder is partitioned across multiple sub-systems, with an optimal mapping to various existing hardware and/or software blocks. Key optimizations include reusing hardware designed for the older generation VP6 and VP7 codecs.

A non-exact—or approximate—deblocking loop filter (VP7 loop-filter) is employed. This approximates the visual quality of the VP8 loop filter closely without additional hardware design costs and is significantly better than bypassing loop-filter altogether.

BRIEF DESCRIPTION OF THE DRAWINGS

These and other aspects of this invention are illustrated in the drawings, in which.

DETAILED DESCRIPTION

When the ITU (International Telecommunication Union) released the H.264/AVC (Advanced Video Coder) standard, the basic structure of a whole generation of video codecs was defined.

Many features, such as the merging of multiple pixels to macroblocks (MB), the utilization of temporal and spatial correlation or the usage of an entropy coder were derived from prior video coding standards and optimized to achieve better compression results. The presence of a complete decoder within the encoder is determined by the need for reconstructed image data in order to perform a proper prediction.

1) Encoder: First, each frame is separated into square MBs consisting of multiple pixels, each represented by a luma (Y) and two chroma (Cb, Cr) values. The MBs can be predicted by referencing already coded MBs of the same frame (intra-frame coding) or of other frames (inter-frame coding).

In both cases the reference data is reconstructed from prior coded MBs. Either option requires the computation of the difference between the reconstructed and the predicted data.

This residual is transformed and quantized according to an adjustable quantization table before it is fed to an entropy coder for further data compression.

2) Decoder: The encoder receives the compressed bit stream along with control data and, in case of inter-frame coding, motion vector data. After performing an inverse transformation, the MBs are decoded by adding the regained residual signal to the predicted data.

The decoded MBs pass through a deblocking filter in order to reduce the blocking artifacts typical for this codec paradigm. These altered MBs serve as reference for intra- and inter-frame coding in both encoder and decoder and are assembled to the displayable output stream of the decode.

Figure 1:
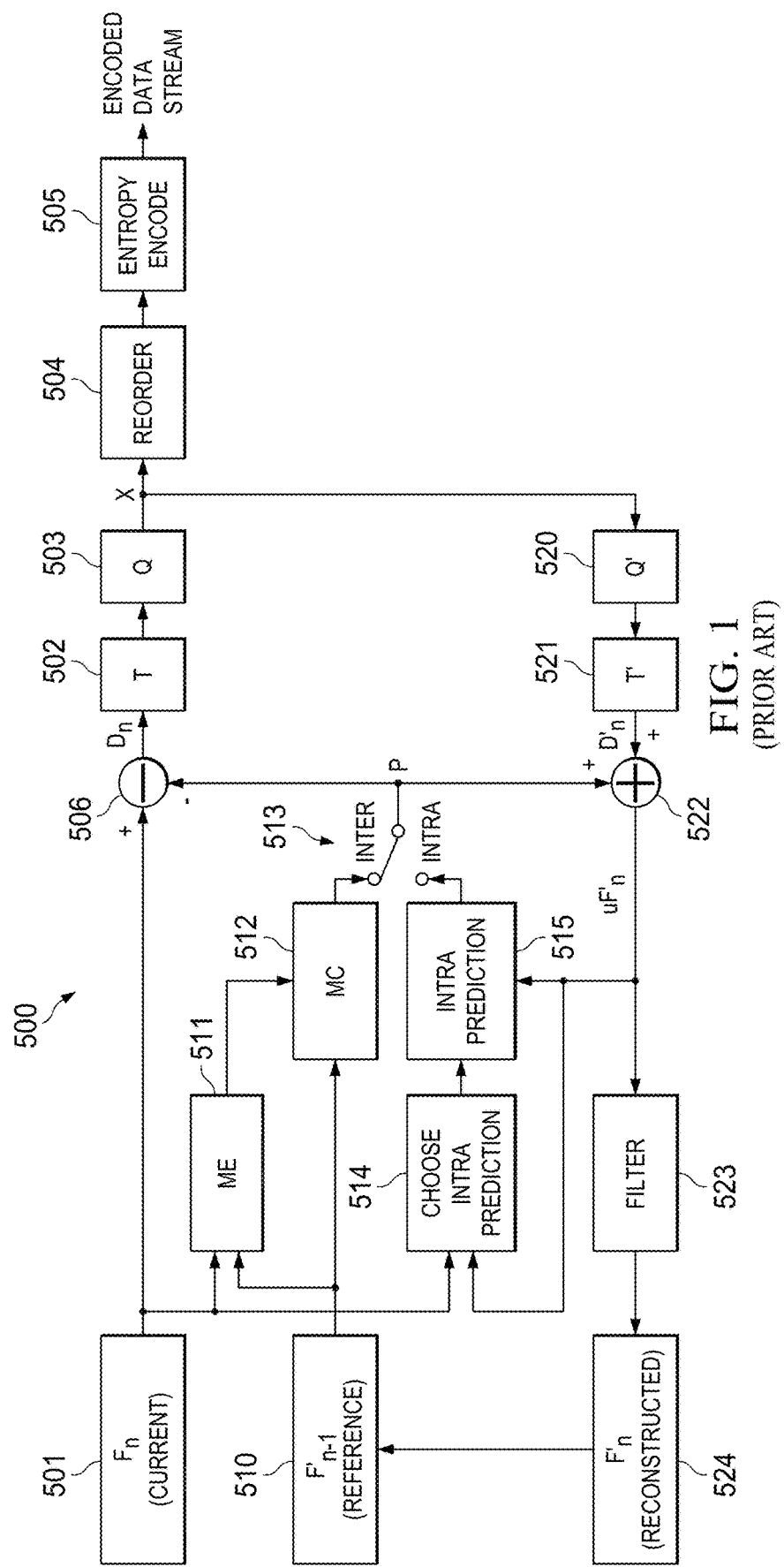
FIG. 1 shows the block diagram of a typical H.264 video encoder.
Figure 2:
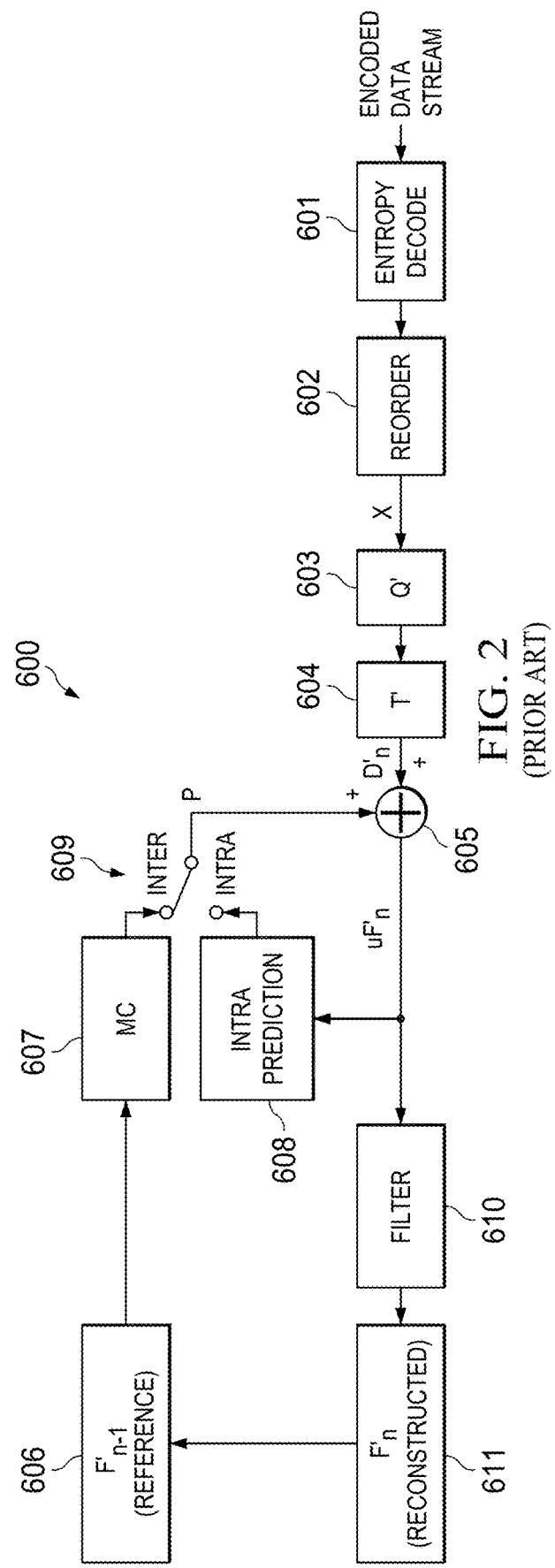
FIG. 2 shows the block diagram of a typical H.264 video decoder.

The operation of a prior art H.264/AVC or MPEG compression system is illustrated in FIGS. 1 and 2. FIG. 1 illustrates the encoding process 500 of video encoding according to the prior art. Many video encoding standards use similar processes such as represented in FIG. 1. Encoding process 500 begins with the n th (current) frame Fn 501. Frequency transform block 502 transforms a macroblock of the pixel data into the spatial frequency domain. This typically involves a discrete cosine transform (DCT).

This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction (inter prediction), data is compared with data from the corresponding location of another frame. In intra frame prediction (intra prediction), data is compared with data from another location in the same frame.

For inter prediction, data from n−1 th (previous) frame Fn−1 510 and data from the n th frame Fn 501 are supplied to motion estimation block 511. Motion estimation block 511 determines the positions and motion vectors of moving objects within the picture. This motion data is supplied to motion compensation block 512 along with data from n−1 th frame Fn−1 510. The resulting motion compensated frame data is selected by switch 513 for application to subtraction unit 506. Subtraction unit 506 subtracts the inter prediction data from switch 513 from the input frame data from n th frame Fn 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the n th frame Fn and the n−1 th frame Fn−1 are identical, the subtraction unit 506 will produce a string of zeros for data. This data string can be encoded using few bits.

The second type of prediction is intra prediction. Intra prediction predicts a macroblock of the current frame from another macroblock of the current frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from n th frame Fn 501 and the output of addition unit 522. Choose intra prediction unit 514 signals intra prediction unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the n th frame Fn 501 data. Periodic unpredicted or I frames limit any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblocking filter 523 smooths artifacts created by the block and macroblock nature of the encoding process. The result is reconstructed frame F'n 524. As shown schematically in FIG. 1, this reconstructed frame F'n 524 becomes the next reference frame Fn−1 510.

FIG. 2 illustrates the corresponding decoding process 600. Entropy decode unit 601 receives the encoded data stream. Entropy decode unit 601 recovers the symbols from the entropy encoding of entropy encoding unit 505. Reorder unit 602 assembles the macroblocks in raster scan order reversing the reordering of reorder unit 504. Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter prediction mode switch 609 selects the output of motion compensation unit 607. Motion compensation unit 607 receives the reference frame F'n−1 606 and applies the motion compensation computed by motion compensation unit 512 and transmitted in the encoded data stream.

Switch 609 may also select an intra-prediction mode. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame F'n 611. As shown schematically in FIG. 2, this reconstructed frame F'n 611 becomes the next reference frame Fn−1 606.

The deblocking filtering of deblocking filter 523 and deblock 610 must be the same. This enables the decoding process to accurately reflect the input frame Fn 501 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

VP8 was created as an H.264/AVC alternative, and shares many of the basic concepts.

The initial ITU-T/H.264 standard was able to handle 4:2:0 chroma sub sampled video material with eight bits per sample which is exactly what VP8 supports. The Fidelity Range Extension (FRExt) amendment in July 2004 raised those limits to a maximum of twelve bits per sample without any chroma sub sampling which extremely broadens the variety of source material and therefore the versatility of the codec in professional scenarios.

The VP8 equivalent to the well-known I-Frames is called key frames. Besides that only inter-frames are defined, matching with P-Frames. The absence of bi-directional prediction frames distinguishes VP8 from the MPEG codecs. Instead of allowing up to 16 arbitrary reference frames like H.264/AVC, VP8 is limited to three, namely the frame coded prior to the current one, the golden frame and the altref frame.

For each inter-frame the latter two references are pointing to the previous key frame by default, but can be irreversibly altered to any prior inter-frame inside a group of pictures (GOP).

Although bi-directional prediction frames are not defined in the VP8 specification, it is possible to emulate them while still complying with the standard. By utilizing the show frame flag, a future frame could be encoded and transferred via the bit stream without being displayed in the decoder. Finally this frame can be referred to as an altref frame for bi-directional inter prediction.

Independent from the chosen prediction mode, H.264/AVC provides a weighted prediction of a single MB based on multiple frames, whereas VP8 only supports referencing one frame per MB.

Intra Coding: H.264/AVC provides three different modes for predicting the luma which differ in the size of sub blocks (SB) (4×4, 8×8 and 16×16) and the number of available prediction modes (9, 9 and 4). Both corresponding chroma components are predicted by the same mode, which is one of those used for 16×16 luma MBs, no matter of their actual sizes. The intra prediction in VP8 is either performed on the whole MB for both chroma and luma providing four different modes or on 16 4×4 SBs of the luma component. The latter case offers ten different prediction modes, with one unique mode which utilizes local gradients on pixel basis.

All prediction modes of both codecs rely on the same basic idea: neighboring patterns are continued in different directions.

Inter Coding: The inter prediction used in H.264/AVC is capable of handling all rectangular SBs that are multiples of 4×4 elements up to 16×16. Both luma and chroma are handled equally. The resulting information consists of the SB size, the difference to the reference MB and a motion vector.

When applying inter prediction to MBs in VP8, no decision on block sizes is necessary. All luma MBs are divided into 4×4 SBs. Again a motion vector and residual for each SB is computed. The chroma components are not handled separately but get predicted by averaging the motion vectors of the corresponding luma MB. In contrast to H.264/AVC which provides a sub pixel precision of ¼, VP8 offers a precision of ⅛ pixel for the luma component that scales with the subsampling rate for the chroma components.

According to current proposals for High Efficiency Video Coding (HEVC), the designated successor of H.264/AVC, flexible MBs help to reduce the data rate significantly. Therefore small and statically sized SBs are an obvious drawback of VP8 by means of coding efficiency.

A central aspect of modern video coders is the simplification of the discrete cosine transformation (DCT) kernel: The approximation by integer values causes non-ideal transformation characteristics that are absorbed by the error-free reverse transformation which is impossible with more accurate floating point kernels. Whereas H.264/AVC pursuits this principle consequently by only using coefficients with an absolute value being either zero or a power of two, VP8 models a DCT kernel more accurately leading to coefficients such e.g. 20091 or 35468.

While deblocking filters slightly improve the coding efficiency and have strong impact on PSNR and the subjective picture quality, they consume a considerable percentage of computation time. Both codecs facilitate filters that work exclusively with bit shift to avoid the usage of real multiplications. While H.264/AVC allows tuning the loop filter behavior down to the level of single MBs, VP8 is limited to so-called segments which e.g. are groups of MBs of the same prediction type or with the same reference frame.

Figure 3:
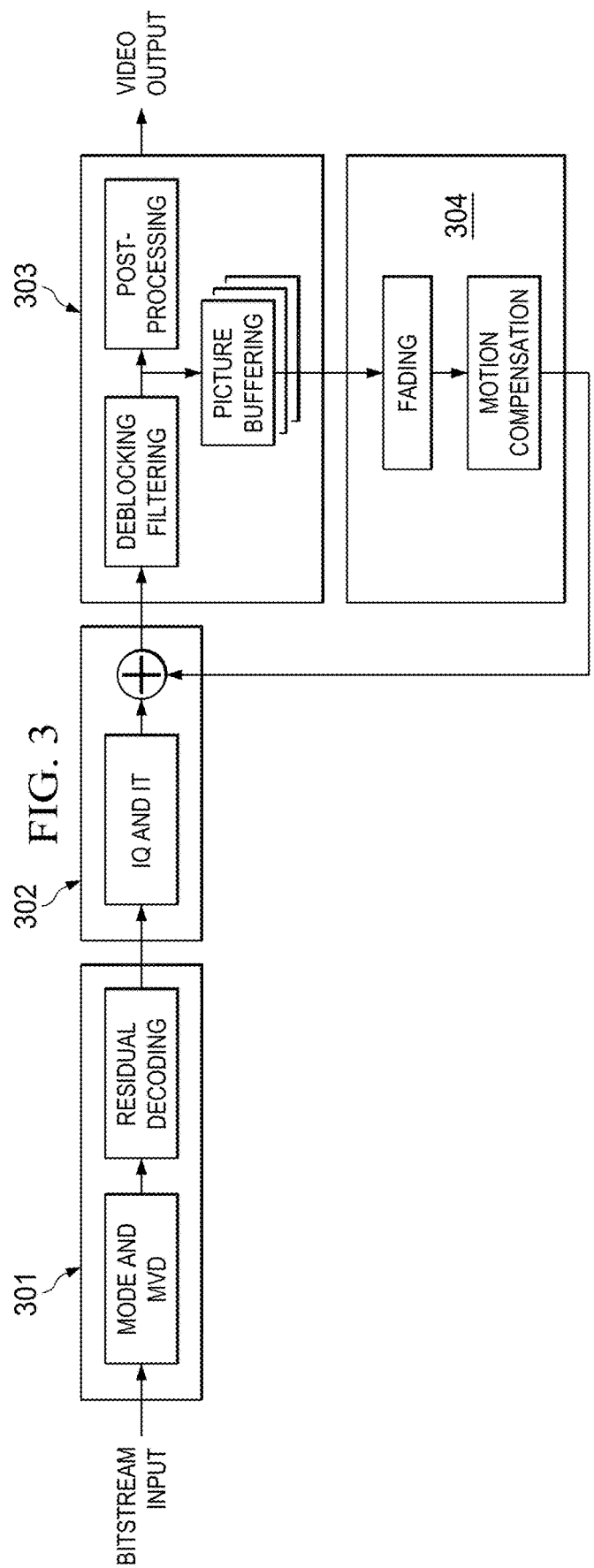
FIG. 3 demonstrates the partitioning described in the invention.

A proposed partitioning of the VP8 decoder is shown in FIG. 3. Block 301 processes the entropy decoding function, usually with a processor such as the Cortex A8 or A9. Block 302 is usually a Digital Signal Processor performing the required calculations, while block 303 implements the deblocking loop filter. Block 304 performs the calculations required for motion compensation. While this partitioning have been found to be optimal, there is no intent to consider them exclusive. Each of the above blocks may be implemented in a variety of ways—in a programmable processor, in software or as a dedicated hardware block.

The deblocking loop filter may be implemented as an approximate filter, resulting in a significant reduction in computational complexity, required computational performance and reduced power consumption. One may also use deblocking filters defined in other video codec standards. This can avoid the cost of adding new hardware for new codecs.

Figure 4:
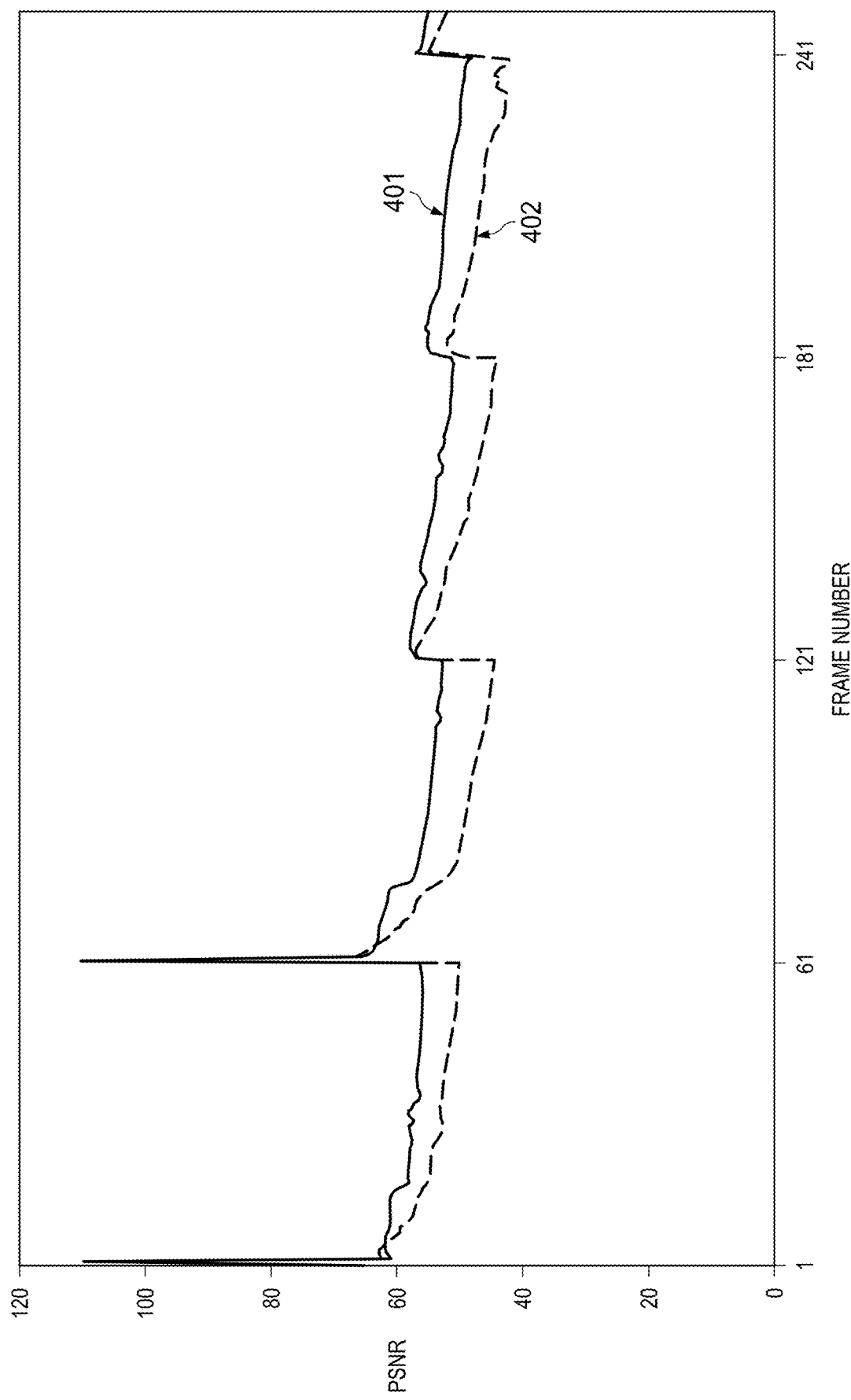
FIG. 4 shows the quality gains using an approximate deblocking loop filter over bypassing loop filter.

FIG. 4 shows the PSNR (Peak Signal to Noise Ratio), where trace 401 represents the decoder performance with approximate loop filtering, and 402 shows performance with no loop filtering. There is a performance gain of up to 5 dB with the filter in the loop. There is also a reduction in drift between I-frames when the filter is employed.

VP8 is the latest of a series of similar video encoders and decoders. The invention described is capable of reusing hardware implemented for the earlier versions, particularly VP6 and VP7. The motion compensation logic employed in VP6 and VP7 is similar to the logic employed in VP8, thus enabling the reuse of hardware designed for the earlier versions. The deblocking loop filters employed in VP7 and VP8 resemble each other closely enough to enable the use the VP7 filter hardware in a VP8 system.

Figure 5:
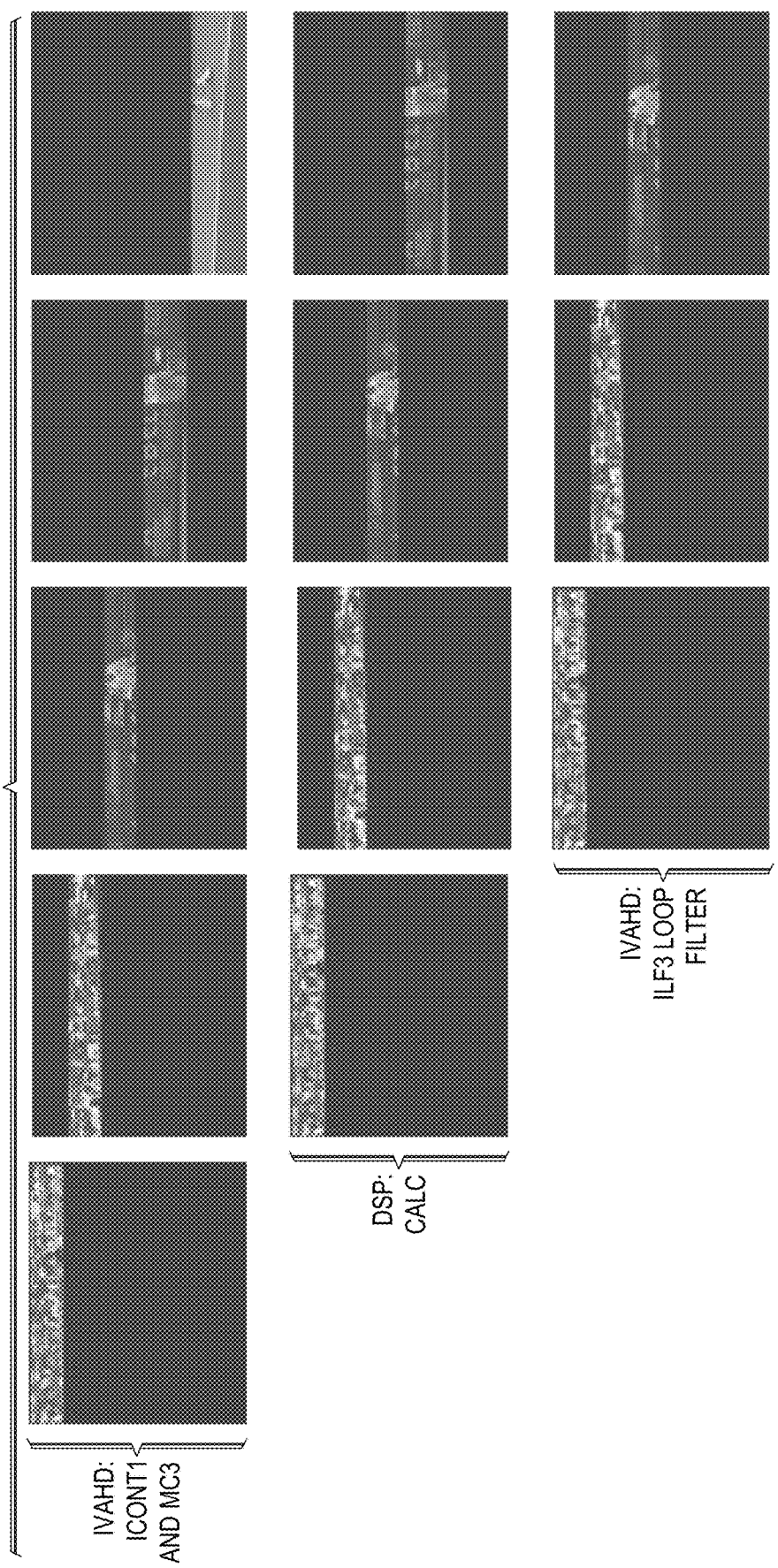
FIG. 5 demonstrates an example of row level pipelining.

In order to reduce memory requirements and decoding latency within a frame, the invention employs frame level pipelining within the entropy decoding block 301, and row level pipelining as shown in FIG. 5 within blocks 302 through 304.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A decoder comprising:
a first stage configured to:
receive a bitstream; and
decode the bitstream based on motion vector difference (MVD) information with entropy decoding at a frame level pipeline of the bitstream to produce a first output;
a second stage configured to:
receive a feedback signal;
perform data processing based on the first output at a row level pipeline of the bitstream to produce a data processed signal; and produce a second output based on the feedback signal and the data processed signal;

a third stage configured to:

receive the second output;

filter the second output at the row level pipeline of the bitstream with an approximate filter to produce a third output; and output a decoded video output based on the third output; and a fourth stage configured to:

receive the third output;

perform motion compensation on the third output; and produce the feedback signal.

2. The decoder of claim 1, wherein:

the data processing of the second stage includes at least one of an inverse quantization operation and an inverse frequency transform operation.

3. The decoder of claim 1, wherein:

the second stage includes summation logic configured to receive the data processed signal and the feedback signal and produce the second output.

4. The decoder of claim 1, wherein:

the third stage includes a deblocking filter is configured to approximate loop filter the second output to produce a filtered output.

5. The decoder of claim 4, wherein:

the third stage includes a post-processing element that receives the filtered output and outputs the decoded video output.

6. The decoder of claim 4, wherein:

the third stage includes a buffer that receives the filtered output and outputs the third output.

7. The decoder of claim 1, wherein:

the fourth stage includes a fading element that receives the third output; and the fading element performs fading compensation at the row level pipeline of the bitstream on the third output to produce a fade compensation output.

8. The decoder of claim 7, wherein:

the fourth stage includes a motion compensation element that receives the fade compensation output; and the motion compensation element performs motion compensation at the row level pipeline of the bitstream on the fade compensation output to produce the feedback signal.

9. A decoding method comprising:

receiving, by an entropy decoder, a bitstream;

decoding at a frame level pipeline of the bitstream, by the entropy decoder, the bitstream based on motion vector difference (MVD) information to produce a first output data;

processing at a row level pipeline of the bitstream, by the entropy decoder, the first output data to produce a second output data, wherein the processing includes one of an inverse quantization operation or an inverse frequency transform operation;

summating, by the entropy decoder, the second output data and a feedback data to produce a third output data;

filtering at the row level pipeline of the bitstream with an approximate filter, by the entropy decoder, the third output data to produce a video output and a fourth output data; and compensating at the row level pipeline of the bitstream, by the entropy decoder, the fourth output data to produce the feedback data.

10. The decoding method of claim 9, wherein:

compensating includes a fading compensation at the row level pipeline of the bitstream and performing a motion compensation operation at the row level pipeline of the bitstream on the fourth output data to produce the feedback data.

11. The decoder of claim 1, wherein to perform the data processing at the row level pipeline, the second stage is configured to perform the data processing based on the first output at a row level of the bitstream to produce the data processed signal.

12. The decoder of claim 11, wherein to filter the second output at the row level pipeline, the third stage is configured to filter the second output at the row level of the bitstream to produce the third output.

13. The decoder of claim 1, wherein the bitstream includes statically sized sub-blocks and each of the statically sized sub-blocks is four by four samples.

14. The decoder of claim 1, wherein the fourth stage is configured to perform the motion compensation on the third output at a precision of one-eighth of a pixel.

15. The method of claim 9, wherein filtering the third output data at the row level pipeline comprises filtering the third output data at the row level of the bitstream to produce the video output and the fourth output data, and wherein compensating the fourth output data at the row level pipeline comprises compensating the fourth output data at the row level of the bitstream to produce the feedback data.

16. The method of claim 9, wherein the bitstream includes statically sized sub-blocks and each of the statically sized sub-blocks is four by four samples.

* * * * *